United States Patent Office 2,929,777
Patented Mar. 22, 1960

2,929,777

CLARIFICATION OF ACIDIC PHOSPHATIC SOLUTIONS

Kyle D. Clevenger, Lakeland, Fla., assignor to International Minerals & Chemical Corporation, a corporation of New York No Drawing. Application December 11, 1958
Serial No. 779,550

19 Claims. (Cl. 210—53)

This invention generally relates to a process for the clarification of acidic phosphoric solutions. More particularly, the invention relates to a process for the efficient separation of suspended, solid impurities from solutions of inorganic, acidic phosphoric materials such as those formed by the aqueous leaching of acidulated phosphate rock.

In conventional methods for the production of aqueous solutions of inorganic, acidic phosphatic materials, the reaction product which results from reacting phosphate rock with sulfuric acid is water leached to yield a crude aqueous solution product in which is suspended a substantial quantity of solid impurities. This crude aqueous solution product is the so-called wet process phosphoric acid of commerce.

The problems occasioned by suspended solid impurities are particularly acute with respect to wet process phosphoric acid. Conventional practice yields a crude wet process phosphoric acid containing about 15% to 30% by weight of phosphorus pentoxide ($P_2O_5$) and a substantial portion of suspended solid impurities which do not readily settle. Such crude, dilute wet process acid is normally concentrated to increase the $P_2O_5$ content to at least about 45% by weight and more frequently to at least 50% by weight. The resultant concentrated acid is usually black in color. The concentration procedure necessarily also serves to proportionately increase the quantity of suspended solid impurities and yields concentrated acid solutions frequently containing from about 15% to about 30% by volume of suspended solids, which are particularly difficult to remove from the solution.

In general, it has been determined that the impurities present in wet process acidic phosphatic solutions, such as wet process phosphoric acid, generally comprise calcium sulfate hemihydrate ($CaSO_4 \cdot \frac{1}{2}H_2O$), sodium and potassium silicofluoride, iron and aluminum phosphates and, in acidic solutions resulting from concentration, or other procedures in which organic materials are introduced in small amounts, double salts of iron and aluminum phosphates with phosphoric acids bearing organic substituents which may be hypothetically represented by the formula $RPO_4 \cdot 2H_3PO_4$, where "R" is an organic radical derived from the organic material employed in the production of the particular phosphatic solution treated. There may also be varying amounts of other organic matter present.

These various impurities are desirably substantially removed in order to have an acidic phosphatic solution which is saleable in competition with "furnace phosphoric acid" for the manufacture of fertilizers and animal feed grade products. Removal of color is preferable to improve the saleability of the acid regardless of the intended use.

Upon standing in storage or during shipment in tank cars or the like, such acidic phosphatic solutions deposit a layer of solid matter which renders handling of the stored or shipped acid exceedingly difficult and frequently economically infeasible. Some solids and color may be removed from the crude solution by filtration. However, the concentrated acid is very viscous and difficult to filter and further the solids are of such a nature that they readily plug the filter and the solids are very difficult to remove from the filter. Further, even when the acid is filtered, upon standing, solids form in the solution and settle out, thereby producing the same problem again. The solids which subsequently form in the solution and settle out of the solution are usually termed post-precipitated solids, and the mechanism is termed post-precipitation.

It is apparent that the removal of suspended solid impurities from wet process phosphatic solutions as contemplated by this invention differs fundamentally from the defluorination of similar phosphatic solutions. The present invention, which only incidentally reduces the fluorine content of the acidic phosphatic solution treated, is applicable to remove suspended solids from either defluorinated or undefluorinated aqueous solutions of inorganic phosphates.

It is accordingly an object of this invention to provide a method for efficiently removing suspended solid impurities from acidic inorganic phosphatic materials.

It is a further object of the invention to provide a method effective to increase significantly the settling rate of solids suspended in wet process phosphoric acid and similar solutions of acidic inorganic phosphatic materials.

It is an additional object of the invention to provide a wet process phosphoric acid sufficiently free of suspended solid impurities to be shipped or stored without appreciable precipitation or sedimentation over an extended time period.

It is another object of the invention to provide an economical process for the clarification of wet process phosphoric acid.

It is a more specific object of the invention to provide a process which entails the utilization of only noncorrosive, nonfume forming agents for the clarification of wet process phosphoric acid.

It is another specific object of the invention to provide a process for the continuous clarification of concentrated wet process phosphoric acid which is appropriate for installation in a conventional wet process phosphoric acid plant.

Now, in accordance with this invention, it has been discovered that solutions of acidic inorganic phosphates containing suspended solid impurities can efficiently be clarified by agitating such solutions with a boron-containing clarification agent. A boron compound is employed in minor proportions effective to increase the settling rate of the suspended solids. Thereafter, the mixture so produced is handled to settle at least a substantial portion of the impurities. The clarified fraction is then separated from the solids-carrying fraction.

The boron-containing clarification agents generally comprise boron compounds which produce borate ions when in the acidic inorganic phosphate solution treated, such as boric acid, perboric acid, and the alkali metal and alkaline earth metal salts of such acids. The invention contemplates the utilization as clarification agents of individual or essentially pure compounds, and mixtures thereof, as well as materials containing these substances.

The alkali metal salts, including specifically the sodium, potassium and lithium salts of boric and perboric acid, and the alkaline earth metal salts including specifically the magnesium, calcium, strontium and barium salts of boric and perboric acid, are contemplated for use in the invention and it will be appreciated that such salts are converted to free acids by reaction with the acidic phosphatic solutions processed and hence are equivalent agents for use in the invention. Specifically preferred salts are borax or sodium borate, boracite, kernite, and sodium perborate.

Boric acid is, however, particularly preferred since it is readily available and has produced good results. Further, when adding boric acid to the acidic phosphatic solution, the acidity of the acidic phosphatic solution is not appreciably affected and no foreign cations are introduced into the solution.

The exact reason why the boron-containing clarifying agents are so effective has not been definitely established. One theory is that these clarifying agents form complex ions with a coordination number of four and this complexing may aid in clarification. It is not intended, however, that the invention be limited to or by this theory.

The boron-containing clarification agents are effective to some degree in substantially all proportions such that the relative amounts thereof utilized do not constitute an essential feature of the invention. In general, the rate of clarification or settling of solids varies directly with the amount of clarification agent utilized. The practical upper limit of clarification agent concentration is determined to a significant extent by economic considerations including reagent cost, cost of separation of precipitated solids from the clarified acidic solution and dilution of the solution treated. Also, since some of the boron compound remains in solution in the clarified acidic solution, the upper limit is dictated, to some extent, by the maximum boron concentration that can be tolerated in the clarified solution. Normally, clarification agents are employed in a minor proportion requisite to provide from about 0.5 to about 50 pounds and preferably from about 1 to about 30 pounds of agent per ton of acidic solution to be clarified.

The clarification agents may tend to form agglomerates or lumps when mixed with strong acids. Accordingly, conventional expedients to effect uniform dispersion of the agent in the acidic phosphatic solution with a minimum formation of large particles are appropriately utilized. Such expedients include, inter alia, relatively slow addition of the reagent to the acidic solution treated accompanied by vigorous agitation. The boron compound is preferably in solution and, therefore, it is preferable to make up a solution of the boron compound and to add the solution to the acidic phosphatic solution. The solution may readily be made by using a water-soluble boron compound and dissolving the compound in water to form an aqueous solution.

The process of the invention can be practiced under any desired temperature conditions. The settling rate of the suspended solids and the quantity of solids remaining in the clarified acid are, however, both directly in proportion to the treatment and settling temperature. Accordingly, the practice of the invention at elevated temperatures is preferred. The upper temperature limit is determined primarily by the temperature of decomposition or degradation of the boron clarification agent utilized. Hence, the invention generally contemplates operation at all temperatures at which the boron clarification agent utilized is stable. The clarification procedure is preferably performed at temperatures within the range of from about 120° F. to about 250° F., and more preferably from about 175° F. to about 250° F. However, as herein set forth, higher or lower temperatures may be used. Generally, lower temperatures increase the viscosity of the solution with consequent reduction in the settling rate.

The process of the invention is effected in the clarification of acidic phosphatic solutions in all concentrations. Acid phosphate solutions formed by the leaching of phosphate rock may constitute substantially calcium free phosphoric acid, or, depending upon the degree of acidulation, approach monocalcium phosphate solutions characterized by a $CaO/P_2O_5$ mole ratio of about 1:1. The invention is useful in the clarification of all such solutions and more specifically is applicable to acidic phosphatic solutions ranging from phosphorus acid to monocalcium phosphate. The problems which attend the clarification of acidic phosphatic solutions containing in excess of about forty-five percent by weight of $P_2O_5$ is particularly acute and the invention finds important utility in the efficient clarification of such materials. Wet process phosphoric acid having a $P_2O_5$ weight concentration between about 52% and about 56% is effectively clarified using the process of this invention.

It has also been determined that conventional commercial flocculating agents, stable in concentrated mineral acids, and specifically stable in the acidic phosphatic solution being treated, may advantageously be utilized subsequent to the addition of the boron-containing clarifying agent of this invention, to expedite the solids settling rate and yield clarified acidic solutions containing a comparatively smaller amount of residual solid impurities. The use of flocculating agents of this type by themselves, i.e., without the prior use of the boron-containing clarifying agent, is relatively ineffective and substantially no increase in the rate of settling of solids is noted. For this reason it would not be expected that the flocculating agent would have any effect in the acidic solution when it is first treated with the boron-containing clarifying agent. However, it has been determined that the flocculating agent has a beneficial effect if added subsequent to the addition of the clarifying agent.

Flocculating agents suitable for such utilization include water-soluble high molecular weight synthetic polymers such as the polyacrylamides which are sold under the commercial trade name "Separan," guar, the hydrolyzed polyacrylonitrile resins or the salts thereof such as the sodium and potassium salts, and the like. Such commercial flocculating agents are employed in the conventional manner normally in water solution, in about 0.05 to about 2% by weight, in an amount requisite to provide from about 0.001 to about 2 pounds thereof per ton of acidic phosphatic solution treated, and more preferably from about 0.003 to about 0.5 pound per ton of acidic phosphatic solution treated.

It has also been determined that acids, in addition to phosphoric acid and boric acid may advantageously be utilized with the boron-containing clarifying agent to expedite the solids settling rate and yield clarified acidic solutions containing a comparatively smaller amount of residual solid impurities. Strong mineral acids are preferred. The use of the mineral acids by themselves is relatively ineffective; however, it has been determined that the mineral acid has a beneficial effect when added with the boron-containing agent to the acidic phosphatic solution.

Strong mineral acids suitable for such utilization include nitric acid, hydrochloric acid, sulfuric acid, etc. Sulfuric acid is particularly preferred because of its ready availability in commercial plants producing wet process phosphoric acid. It has further been determined that sulfuric acid when added in amounts of greater than about 2% by weight of the acidic phosphatic solution, decreases the amount of post-precipitated solids. The mineral acids are usually employed in amounts of from about 0.05% to about 10% by weight of the acidic phosphatic solution and preferably in amounts of from about 0.5% to about 6% by weight. One or more strong mineral acids may be used when desired and the total amounts of acid will be within the ranges set forth.

It has further been determined that surface active agents may advantageously be used with the boron-containing clarifying agent. The use of surface active agents by themselves is relatively ineffective; however, it has been determined that they have some beneficial effect when added with the boron-containing clarifying agent. Experimental data have indicated that the surface active agents improve the color of the clarified acid, that is, the clarified acid is lighter in color when the surface active agent is used.

Particularly preferred surface active agents are the commercially available detergents. Specifically preferred surface active agents are sodium sulfate, sulfonated lauryl alcohol, and the sodium salt of dodecyl benzene sulfonate. The surface active agents are usually employed in amounts of from about 0.01% to about 5% by weight of the acidic phosphatic solution and preferably from about 0.02 to about 1% by weight of the acidic phosphatic solution. One or more surface active agents may be used when desired and the total amount used will be within the ranges set forth.

As hereinbefore mentioned, a flocculating agent may be utilized when desired. The strong mineral acid may be used either with or without the use of the flocculating agent; and, similarly, the surface active agents may be used either with or without the use of the strong mineral acid. It has been determined that a boron-containing clarification agent and sulfuric acid mixture is a particularly effective mixture for use in accordance with this invention and it has also been determined to be particularly beneficial to use a flocculating agent, in the manner described herein, after the addition of the boron compound-sulfuric acid mixture is mixed into wet process phosphoric acid.

After the addition of the boron-containing clarification agent, and after the addition of the flocculating agent and/or mineral acid and/or surface active agent, when used, the mixture is handled in a manner to permit the solids to settle out to produce a clarified fraction and a solids-carrying fraction. The mixture may be maintained quiescent thereby permitting the solids to settle or the mixture may be centrifuged thereby settling the solids. Other methods of settling solids in a liquid may, of course, be used.

The sludge or solids layer resulting from the clarification of acidic phosphatic solutions in accordance with this invention contains a substantial proportion of $P_2O_5$ and is useful, inter alia, in the manufacture of fertilizers and particularly as a binding agent for the manufacture of granulated phosphatic fertilizers.

In order to give a fuller understanding of the invention, but with no intention to be limited thereto, the following specific examples are given.

EXAMPLE I

Three 50 ml. samples of concentrated wet process phosphoric acid having approximately a 54% $P_2O_5$ content were each vigorously agitated with specified amounts of boric acid for about two to three minutes. A fourth sample with no additive was also agitated. The samples were then maintained quiescent and settling rates were determined by measuring the depth of the clarified acid after specified time periods.

In all cases the tests were conducted by contacting the wet process phosphoric acid at a temperature of 190–200° F. with the boric acid and permitting the settling to occur at ambient temperature.

Table I

| Test No. | Additive | Additive Concentration, Pounds per ton of acid | Volume Percent Clarified Acid (48 hours) |
|---|---|---|---|
| 1 | Boric acid | 40 | 50. |
| 2 | do | 20 | 42. |
| 3 | do | 10 | 26. |
| 4 | None | 0 | No ascertainable settling. |

EXAMPLE II

A series of tests were conducted on 54% $P_2O_5$ wet process phosphoric acid in substantially the same manner as tests 1 to 3 of Example I. However, in this example, after the addition of specified amounts of boric acid with vigorous agitation, a commercial polyacrylamide flocculant sold under the trade name "Separan 2610" was added in the form of a 0.1% water solution in an amount equivalent to 0.1 lb./ton of acid.

Table II

| Test No. | Additive | Boric acid Concentration, Pounds per ton of acid | Volume Percent Clarified Acid (48 hours) |
|---|---|---|---|
| 5 | Boric acid and Separan | 40 | 62 |
| 6 | do | 20 | 62 |
| 7 | do | 10 | 58 |

EXAMPLE III

A series of tests were conducted on a similar wet process phosphoric acid in substantially the same manner as described in Example II. The results are tabulated below in Table III. In Test 9, no boric acid was added and only Separan was added. In Test 8, only boric acid was used. The results illustrate the comporative ineffectiveness of a flocculating agent when used alone.

Table III

| Test No. | Additive | Additive Concentration Pounds per ton of acid | Settling Time, Hrs. | Volume Percent Clarified acid |
|---|---|---|---|---|
| 8 | Boric acid | 20 | 4 | 50. |
|  | do | 20 | 8 | 50. |
|  | do | 20 | 12 | 61. |
| 9 | Separan | 0.1 | 4 | 0. |
|  | do | 0.1 | 8 | 0. |
|  | do | 0.1 | 12 | 0. (No ascertainable settling.) |

EXAMPLE IV

In another test, designated Test 10, Test 6 was repeated with the exception that a defluorinated wet process phosphoric acid was employed. After 24 hours of remaining quiescent, 90 volume percent of clarified acid was noted.

EXAMPLE V

In another series of tests, designated Tests 11 and 12, Tests 6 and 9, respectively, were repeated with the exception that after 36 hours of remaining quiescent, the clear acid was decanted and the clear acid was held at 190° F. for an additional 48 hours. (Some clear acid was obtained using only Separan after holding for 36 hours.) In the test using only Separan, 4.4% by volume of additional solids precipitated. In the test using only boric acid, 1.7% by volume of additional solids precipitated. These tests illustrate that the use of boric acid substantially reduces the amount of post-precipitated solids.

EXAMPLE VI

A series of tests were conducted on a similar 54% $P_2O_5$ wet process phosphoric acid in substantially the same manner as described in Example II. In this series, concentrated sulfuric acid, when used, was mixed with the boric acid before adding to the phosphoric acid. "Separan 2610" was used in all of these tests and was added in the form of a 0.1% water solution in an amount equivalent to 0.1 pound per ton of acid.

Table IV

| Test No. | Boric Acid Concentration, Pounds per ton of Acid | Sulfuric Acid Concentration, Weight Percent of Phosphoric Acid | Volume Percent Clarified Acid (24 hours) |
|---|---|---|---|
| 13 | 20 | 2.0 | 54 |
| 14 | 20 | 4.0 | 57 |

Each of these samples was permitted to stand quiescent for an additional 20 days. At the end of the 20 days, the sample of Test 13 precipitated an additional 15% by volume of solids while the sample of Test 14 precipitated only an additional 4% by volume of solids. This test illustrates that the use of sulfuric acid in amounts greater than about 2.0% along with boric acid, reduces the amount of post-precipitated solids.

EXAMPLE VII

Samples of concentrated 54% $P_2O_5$ wet process phosphoric acid were each vigorously agitated with specified amounts of a boron compound. After agitating with the additives, the samples were maintained quiescent and settling rates were determined by measuring the depth of clarified acid after specified times. When "Separan 2610" was used, as indicated, it was added with only mild agitation after the addition of the other additives. The weight percent indicated is the weight percent of the wet process phosphoric acid.

Table V

| Test No. | Additive | Weight Percent of Additive | Settling Rate, Inches per Hr. | Volume Percent Clarified Acid (24 hours) |
|---|---|---|---|---|
| 15 | $Na_2B_4O_7$<br>$H_2SO_4$<br>Separan | 0.61<br>4.0<br>0.005 | 5.0 | 64 |
| 16 | $Na_2B_4O_7$<br>Separan | 0.77<br>0.005 | 5.5 | 74 |
| 17 | $H_3BO_3$<br>Separan<br>$H_2SO_4$<br>Sodium Dodecyl Benzene Sulfonate<br>Sodium Lauryl Sulfate | 0.5<br>0.008<br>4.0<br>0.06<br>0.06 | 1.7 | 50 |
| 18 | $H_3BO_3$<br>Separan<br>Sodium Lauryl Sulfate | 1.0<br>0.005<br>0.05 | 11.5 | 69 |
| 19 | $H_3BO_3$<br>Separan<br>$Na_2SO_4$ | 1.0<br>0.01<br>0.06 | 4 | 62 |
| 20 | $H_3BO_3$<br>Separan<br>Orvus [1] | 1.0<br>0.01<br>0.1 | 17 | 79 |

[1] Orvus is the trade name of a commercially available gardinol type synthetic detergent sold by Procter and Gamble Distributing Company The invention, as illustrated by the foregoing examples, affords an efficient and economical method for the rapid clarification of wet process acidic phosphatic solutions. The clarified product is of good quality and the sludge or solids material formed finds utility in the fertilizer industry. The invention accordingly represents a significant contribution to the art.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A process for the clarification of an acidic inorganic phosphate solution containing suspended solid impurities which comprises agitating said solution with a boron-containing clarification agent, said clarification agent being employed in a minor proportion effective to increase the settling rate of said suspended solids, and thereafter separately recovering a clarified fraction and a solids-carrying fraction.

2. The process of claim 1 wherein the acidic phosphate solution is obtained by the aqueous leaching of acidulated phosphate rock.

3. The process of claim 1 wherein the acidic phosphate solution is wet process phosphoric acid.

4. A process for the clarification of an acidic inorganic phosphate solution containing suspended solid impurities which comprises agitating said solution with a boron-containing clarification agent which produces borate ions in the acidic inorganic phosphate solution, said clarification agent being employed in a minor proportion effective to increase the settling rate of said suspended solids, and thereafter separately recovering a clarified fraction and a solids-carrying fraction.

5. The process of claim 4 wherein said boron-containing clarification agent comprises boric acid.

6. The process of claim 4 wherein said boron-containing clarification agent comprises a sodium salt of boric acid.

7. The process of claim 4 wherein said boron-containing clarification agent is employed in amount requisite to provide from about .05 to about 50 pounds thereof per ton of acidic inorganic phosphate solution treated.

8. A process for the clarification of wet process phosphoric acid containing at least about forty-five percent by weight of phosphorus pentoxide and containing suspended solid impurities which comprises agitating said wet process phosphoric acid with boric acid, said boric acid being employed in a minor proportion effective to increase the settling rate of said suspended solids, and thereafter handling the mixture so produced to settle at least a substantial portion of said impurities, and separating the clarified solution from the settled impurities.

9. A process for the clarification of an acidic inorganic phosphate solution containing suspended solid impurities which comprises agitating said solution with a boron-containing clarification agent which produces borate ions in the acidic inorganic phosphate solution, adding to the mixture a flocculating agent stable in concentrated mineral acid solution, said clarification agent and said flocculating agent each being employed in a minor proportion effective to increase the settling rate of said suspended solids, and thereafter maintaining the mixture so produced quiescent to settle at least a substantial portion of said impurities, and separating the clarified supernatant solution from said settled impurities.

10. The process of claim 9 wherein said boron-containing clarification agent comprises boric acid.

11. A process for the clarification of wet process phosphoric acid containing suspended solid impurities which comprises agitating said wet process phosphoric acid with a boron-containing clarification agent which produces borate ions in the phosphoric acid, said clarification agent being employed in an amount requisite to provide from about 0.5 to about 50 pounds thereof per ton of phosphoric acid treated, adding to the mixture a flocculating agent stable in concentrated mineral acid solution, and thereafter maintaining the mixture so produced quiescent to settle at least a substantial portion of said impurities, and separating the clarified supernatant solution from said settled impurities.

12. A process for the clarification of wet process phosphoric acid containing suspended solid impurities which comprises agitating said wet process phosphoric acid with a strong mineral acid and with a boron-containing clarification agent which produces borate ions in the phosphoric acid, said clarification agent being employed in an amount requisite to provide from about 0.5 to about 50 pounds thereof per ton of phosphoric acid treated, and thereafter handling the mixture so produced to settle at least a substantial portion of said impurities, and separating the clarified solution from the settled impurities.

13. The process of claim 12 wherein said strong mineral acid comprises sulfuric acid used in amount of from about 0.05% to about 10% by weight of the wet process phosphoric acid treated.

14. A process for the clarification of wet process phosphoric acid containing suspended solid impurities which comprises agitating said wet process phosphoric acid with a surface active agent and with a boron-containing clarification agent which produces borate ions in the phosphoric acid, said clarification agent being employed in an amount requisite to provide from about 0.5 to about 50 pounds thereof per ton of phosphoric acid treated, and thereafter handling the mixture so produced to settle at least a substantial portion of said impurities, and separating the clarified solution from the settled impurities.

15. The process of claim 14 wherein said surface active agent is used in amount of from about 0.01% to about 5% by weight of the wet process phosphoric acid treated.

16. A process for the clarification of wet process phosphoric acid containing suspended solid impurities which comprises agitating said wet process phosphoric acid with a boron-containing clarification agent which produces borate ions in the phosphoric acid, said clarification agent being employed in an amount requisite to provide from about 0.5 to about 50 pounds thereof per ton of phosphoric acid treated, adding to the mixture a flocculating agent stable in concentrated mineral acid solution, said flocculating agent being employed in an amount requisite to provide from about 0.001 to about 2.0 pounds thereof per ton of phosphoric acid treated, and thereafter maintaining the mixture so produced quiescent to settle at least a substantial portion of said impurities, and separating the clarified supernatant solution from said settled impurities.

17. The process of claim 16 wherein said boron-containing clarification agent comprises boric acid.

18. The process of claim 16 wherein said flocculating agent comprises a water soluble polyacrylamide resin.

19. A process for the clarification of wet process phosphoric acid containing suspended solid impurities which comprises agitating said wet process phosphoric acid with boric acid and sulfuric acid, said boric acid being employed in an amount requisite to provide from about 1 to about 30 pounds thereof per ton of phosphoric acid treated, and said sulfuric acid being used in amount of from about 0.05% to about 10% by weight of the wet process phosphoric acid treated, adding to the mixture a flocculating agent stable in concentrated mineral acid solution, said flocculating agent being employed in an amount requisite to provide from about 0.001 to about 2.0 pounds thereof per ton of phosphoric acid treated, and thereafter maintaining the mixture so produced quiescent to settle at least a substantial portion of said impurities, and separating the clarified supernatant solution from said settled impurities.

References Cited in the file of this patent

UNITED STATES PATENTS

| | | |
|---|---|---|
| 629,411 | Wilson | July 25, 1899 |
| 2,375,638 | Englund | May 8, 1945 |